United States Patent
Qin et al.

(10) Patent No.: US 11,214,732 B2
(45) Date of Patent: Jan. 4, 2022

(54) QUANTUM DOT SURFACE LIGAND EXCHANGE METHOD

(71) Applicant: TCL TECHNOLOGY GROUP CORPORATION, Huizhou (CN)

(72) Inventors: Huijun Qin, Huizhou (CN); Yixing Yang, Huizhou (CN)

(73) Assignee: TCL TECHNOLOGY GROUP CORPORATION, Huizhou (CN)

( * ) Notice: Subject to any disclaimer, the term of this patent is extended or adjusted under 35 U.S.C. 154(b) by 112 days.

(21) Appl. No.: 16/617,966

(22) PCT Filed: Mar. 20, 2018

(86) PCT No.: PCT/CN2018/079531
§ 371 (c)(1),
(2) Date: Nov. 27, 2019

(87) PCT Pub. No.: WO2018/219019
PCT Pub. Date: Dec. 6, 2018

(65) Prior Publication Data
US 2020/0172801 A1 Jun. 4, 2020

(30) Foreign Application Priority Data

May 31, 2017 (CN) .......................... 201710399234.1
May 31, 2017 (CN) .......................... 201710399235.6
(Continued)

(51) Int. Cl.
C09K 11/02 (2006.01)
C09K 11/88 (2006.01)
(Continued)

(52) U.S. Cl.
CPC ............ C09K 11/025 (2013.01); C09K 11/88 (2013.01); B82Y 20/00 (2013.01); B82Y 40/00 (2013.01)

(58) Field of Classification Search
CPC ....... C09K 11/025; C09K 11/88; B82Y 20/00; B82Y 40/00
See application file for complete search history.

(56) References Cited

U.S. PATENT DOCUMENTS 8,771,177 B2 * 7/2014 Hale .................. G02B 23/2476
600/173

FOREIGN PATENT DOCUMENTS

| CN | 105062462 A | 11/2015 |
| CN | 106367060 | * 2/2017 |
| CN | 106367060 A | 2/2017 |

OTHER PUBLICATIONS

Translation for CN 106367060, Feb. 1, 2017.*
(Continued)

*Primary Examiner* — C Melissa Koslow
(74) *Attorney, Agent, or Firm* — Anova Law Group, PLLC

(57) ABSTRACT

Provided is a quantum dot surface ligand exchange method. The method comprises the steps: pre-treating proton-containing ligands using a deprotonating agent to obtain deprotonated ligands; mixing a pre-prepared quantum dot solution having original ligands with the deprotonated ligands, after stirring for a predetermined amount of time at room temperature, a ligand exchange reaction occurring, and after washing, obtaining a quantum dot having the deprotonated ligands on the surface. The quantum dot ligand exchange method has a high reaction rate and is easy to operate; after the ligand exchange, the deprotonated ligands firmly bind to cations on the surface of the quantum dot, and after the ligand exchange, the quantum dot provides a stable colloidal solution, and has good solubility and high luminous efficiency.

10 Claims, 2 Drawing Sheets

(30) Foreign Application Priority Data

| May 31, 2017 | (CN) | ......................... 201710400292.1 |
| May 31, 2017 | (CN) | ......................... 201710400293.6 |
| May 31, 2017 | (CN) | ......................... 201710401287.2 |
| May 31, 2017 | (CN) | ......................... 201710401288.7 |

(51) Int. Cl.
*B82Y 20/00* (2011.01)
*B82Y 40/00* (2011.01)

(56) References Cited

OTHER PUBLICATIONS

The World Intellectual Property Organization (WIPO) International Search Report for PCT/CN2018/079531 dated Jun. 7, 2018 6 Pages.
Chu, Congbo et al., Application of Quantum Dots in Biological Detection, Chinese Journal of Applied Chemistry, vol. 31, Apr. 2014, pp. 377-388.

* cited by examiner

QUANTUM DOT SURFACE LIGAND EXCHANGE METHOD

CROSS-REFERENCES TO RELATED APPLICATIONS

This application is a national stage application of PCT Patent Application No. PCT/CN2018/079531, filed on Mar. 20, 2018, which claims priority to Chinese Patent Applications No. 2017103992341, 2017103992356, 2017104002921, 2017104002936, 2017104012872 and 2017104012887, filed on May 31, 2017, the content of all of which is incorporated herein by reference.

FIELD OF THE INVENTION

The present disclosure relates to the field of quantum dot technology, and more particularly, to a quantum dot surface ligand exchange method.

BACKGROUND

A Fluorescent semiconductor nanocrystal, also called a quantum dot. Compared to a traditional fluorescent dye molecule, the quantum dot has a plurality of unique luminescent properties, including a plurality of characters: a photobleaching resistance, a wide-band excitation, an adjustable emission bandgap, and more, thus it has been widely applied to a plurality of fields including optoelectronic devices, biomedical fields and more.

Currently, a most common method for preparing the quantum dot is thermally injecting a metal-organic cation precursor into an anion precursor at a high temperature, for reacting and forming the quantum dot. A plurality of organic substances are introduced into the anion precursors and the cation precursors, including: trioctylphosphine, tributylphosphine, oleic acid, stearic acid, oleylamine, and more. Introducing the organic substances is able to adjust a crystal growth rate, a crystal morphology, and a crystal size distribution of the quantum dots. In addition, the organic substances may act as a surface capping agent for the quantum dots, reducing a plurality of surface defects and improving a luminous efficiency of the quantum dot. However, the quantum dots having a surface ligand of the organic substances listed above have a plurality of problems below:

First, how a ligand with a suitable electronic structure but a poor binding ability is able to bind strongly to the quantum dot: a functional group and a chain length of a ligand have determined an electronic structure thereof, thereby affecting a surface electron or hole wave function and an electron transport performance of a quantum dot film layer. For example, when an amino ligand is combined with a surface of a CdSe quantum dot, the amino ligand can act directly as a shell structure of the quantum dot, to improve the luminous efficiency of the quantum dot, without requiring a growth of an inorganic shell structure. In addition, when the surface ligand of the CdSe quantum dot is 3-mercaptopropionic acid, a surface electron wave function moves to the surface of the quantum dot, and when the surface ligand is alanine, the surface electron wave function moves to an inner core, while an electron transport efficiency at an interface of $TiO_2$ is 3 to 4 times higher than that without an alanine ligand. However, some ligands with suitable electronic structures have a weak binding ability to the quantum dots; they are not easy to replace an original ligand to bind to the quantum dots. Therefore, how to make such a kind of ligands bind effectively to the quantum dots still has a great challenge existing Second, a stability of a colloidal solution is poor: a quantum dot colloid solution will have a plurality of particles agglomerating and forming a precipitate, after being placed for a short time (several days), because an organic substance acting as the ligand has a weak binding ability to an ion on the surface of the quantum dot, and the ligand is falling off in a short time. In response to this problem, some researchers have proposed to add a long-chain thiol ligand before stirring in a late stage of a quantum dot formation reaction, to improve the stability of the quantum dots. The thiol ligand has a strong binding ability to the quantum dots, and when combined to the surfaces of the quantum dots, it may form —SH or a thiolate, wherein —SH can't effectively solve a problem of a ligand shedding. While the thiolate has a proton removed, it will have a stronger binding ability than —SH to the cation on the surface of the quantum dot, being able to improve the stability of the quantum dot colloid solution up to more than several months. Therefore, if the thiol can have the proton removed and form a thiolate, the stability of the quantum dot solution may be improved.

Third, the quantum dots prepared by a thermal injection method are mostly oil soluble, which has greatly limited an applicability thereof: the quantum dots having surface ligands of trioctylphosphine, tributylphosphine, oleic acid, stearic acid, oleylamine and more, can only be dissolved in a non-polar solvent, such as chloroform, toluene, octane, n-hexane, and more. If the quantum dots are required to dissolve in a polar solvent, a ligand exchange will be required to make the quantum dots have a phase transformation. For a process of the phase transformation, researchers have proposed to add a water-soluble ligand such as a mercapto acid to the quantum dot solution before stirring, to replace an original ligand and obtain a water/alcohol soluble ligand. Such a ligand exchange process requires a long time stirring, or requires an aid of an ultrasonic heating process, while an exchange rate is low, the solubility in a water/alcohol solution is not high after the phase transformation, and a stability of the solution is poor.

Therefore, the current technology needs to be improved and developed.

BRIEF SUMMARY OF THE DISCLOSURE

According to the defects described above in the prior art, the purpose of the present disclosure is providing a quantum dot surface ligand exchange method, in order to solve the problems in the prior art that a binding between the surfaces of the quantum dots and the ligand is not solid, a stability and a dispersion of the quantum dot colloid solution is relatively poor.

In order to solve the technical problems mentioned above, the technical solution of the present disclosure is as follows:

A quantum dot surface ligand exchange method, wherein comprising a plurality of steps:

A. pretreating a proton-containing ligand by a deprotonating agent, and obtaining a deprotonated ligand;

B. mixing a solution of a quantum dot having an original ligand prepared in advance with the deprotonated ligand, stirring for a predetermined time at a room temperature for a ligand exchange reaction to occur, and a quantum dot having a surface of the deprotonated ligand is obtained after washing a reaction product from the ligand exchange reaction.

The quantum dot surface ligand exchange method, wherein the step A comprises specifically:

adding the deprotonating agent to a solution of the proton-containing ligand, stirring at the room temperature for 15-120 min, before obtaining a solution of the deprotonated ligand.

The quantum dot surface ligand exchange method, wherein a molar ratio of the deprotonating agent to the proton-containing ligand is 1:1-6 in the step A.

The quantum dot surface ligand exchange method, wherein the step B further comprises:

after the ligand exchange reaction was completed, standing for 10-30 min, finally adding ethyl acetate and centrifugating for 2-4 times, before obtaining the quantum dot having the surface of the deprotonated ligand.

The quantum dot surface ligand exchange method, wherein the original ligand in the step B is one of a trioctylphosphine, a trioctylphosphine oxide, a tributylphosphine, a tributylphosphine oxide, an oleic acid, a stearic acid, or an oleylamine.

The quantum dot surface ligand exchange method, wherein, a molar ratio of the quantum dot having the original ligand to the deprotonated ligand is 1:1-8 in the step B.

The quantum dot surface ligand exchange method, wherein the deprotonating agent is one of an organic base, an inorganic base, a carboxylic acid, an acyl chloride or a sulfonyl chloride.

The quantum dot surface ligand exchange method, wherein the organic base is one of a tetramethylammonium hydroxide, a tetraethylammonium hydroxide, a tetrapropylammonium hydroxide, a tetrabutylammonium hydroxide, a tetrapentylammonium hydroxide, a tetrahexylammonium hydroxide, a tetraoctylammonium hydroxide, a methyltriethylammonium hydroxide, a trimethylphenylammonium hydroxide, a cetyltrimethylammonium hydroxide or a hexatrimethylammonium hydroxide.

The quantum dot surface ligand exchange method, wherein the carboxylic acid is one of a formic acid, an acetic acid, a propionic acid, a butyric acid, a valeric acid, a hexanoic acid, a caprylic acid, a heptanoic acid, a benzoic acid, a phenylacetic acid, a phenylpropionic acid, a phenylbutyric acid, a phenylvaleric acid, a phenylhexanoic acid or a phenylalanine.

The quantum dot surface ligand exchange method, wherein the acyl chloride is one of acetyl chloride, propionyl chloride, butyryl chloride, valeryl chloride, hexanoyl chloride, 2-chloropropionyl chloride, 3-chloropropionyl chloride, 4-chlorobutyryl chloride, 1-butylsulfonyl chloride, 1-hexadecanesulfonyl chloride, 1-octanesulfonyl chloride, 1,7-peptanedioyl chloride, 1,3,5-benzenetricarboxylic acyl chloride, 4-chlorobenzoyl chloride, 5-chlorovaleryl chloride, 6-chlorohexanoyl chloride or 2-chloropyridine-4-carbonyl chloride.

The quantum dot surface ligand exchange method, wherein the sulfonyl chloride is one of methylsulfonyl chloride, ethylsulfonyl chloride, propylsulfonyl chloride, butylsulfonyl chloride, pentylsulfonyl chloride, hexylsulfonyl chloride, octanesulfonyl chloride, hexadecanesulfonyl chloride, 2-chloroethanesulfonyl chloride, benzenesulfonyl chloride or p-benzenesulfonyl chloride.

The quantum dot surface ligand exchange method, wherein, the proton-containing ligand is one of a carboxylic acid having a C atom number equal to or less than 18, a proton-containing sulfhydryl ligand, or a proton-containing amine.

The quantum dot surface ligand exchange method, wherein the carboxylic acid having a C atom number equal to or less than 18, is one of a valeric acid, a pentenoic acid, a hexanoic acid, a hexenoic acid, a nonanoic acid, a decanoic acid, an undecanoic acid, an undecylenic acid, a dodecanoic acid, a dodecenoic acid, a myristyl acid, a tetradecenic acid, a palmiticacid acid, a hexadecenoic acid, an oleic acid or an octadecanoic acid.

The quantum dot surface ligand exchange method, wherein, the proton-containing sulfhydryl ligand is one of a thiol, a dithiol, a mercapto acid, a mercapto alcohol or a mercaptoamine.

The quantum dot surface ligand exchange method, wherein, the proton-containing amine is one of an alkylamine, a mercaptoamine, an amino acid or an amide.

Benefits: The present invention provides a quantum dot surface ligand exchange method, wherein a ligand containing a special functional group (a carboxyl, a thiol or an amino) is first pretreated with a deprotonating agent to obtain a deprotonated ligand. Then the deprotonated ligand and a solution of the quantum dot having the original ligand prepared are mixed and stirred, to make a ligand exchange reaction, and a quantum dot having a surface of the deprotonated ligand is obtained after washing. The quantum dot ligand exchange method provided by the present invention has a fast reaction speed, the deprotonated ligand after exchange binds firmly to the cation on the surface of the quantum dot, and the quantum dot colloid solution after exchange has a strong stability and an excellent solubility.

DETAILED DESCRIPTION OF EMBODIMENTS

The present discloser provides a quantum dot surface ligand exchange method, in order to make the purpose, technical solution and the advantages of the present discloser clearer and more explicit, further detailed descriptions of the present discloser are stated here, referencing to the attached drawings and some preferred embodiments of the present discloser. It should be understood that the detailed embodiments of the discloser described here are used to explain the present discloser only, instead of limiting the present discloser.

Figure 1:
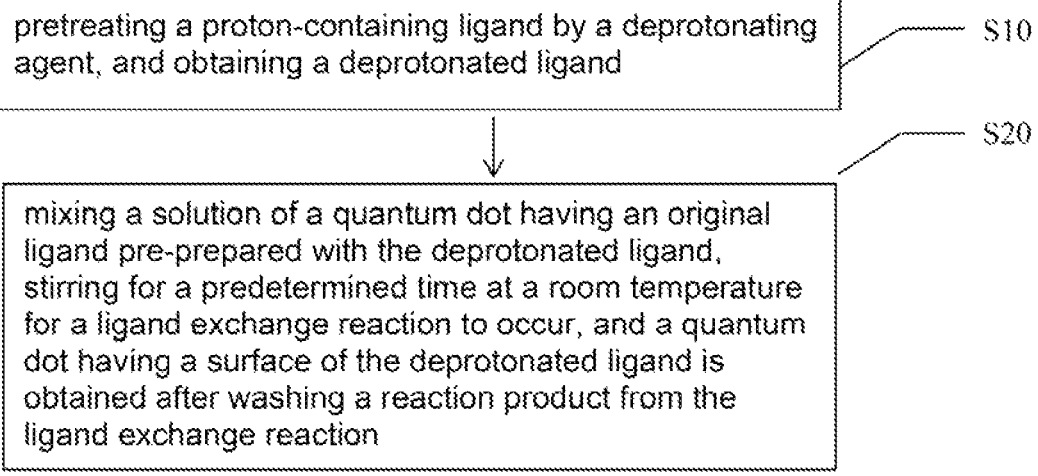
FIG. 1 illustrates a flow chart of a preferred embodiment on the quantum dot surface ligand exchange method disclosed in the present invention.

Referencing to FIG. 1, FIG. 1 illustrates a flow chart of a preferred embodiment on the quantum dot surface ligand exchange method disclosed in the present disclosure, as shown in FIG. 1, wherein comprising a plurality of steps:

S10. pretreating a proton-containing ligand by a deprotonating agent, and obtaining a deprotonated ligand;

S20. mixing a solution of a quantum dot having an original ligand pre-prepared with the deprotonated ligand, stirring for a predetermined time at a room temperature for a ligand exchange reaction to occur, and a quantum dot having a surface of the deprotonated ligand is obtained after washing a reaction product from the ligand exchange reaction.

Specifically, in the present invention, preferably, the proton-containing ligand is one of a carboxylic acid having a C atom number equal to or less than 18, a proton-containing sulfhydryl ligand, or a proton-containing amine, three proton-containing ligands have individually three functional groups of —COOH (carboxyl), —SH (thiol), —NH$_2$ (amino), when the three proton-containing ligands are directly used as quantum dot surface ligands, an H in each functional group of —COOH, —SH, —NH$_2$ of the ligand is in a free state, and the functional groups combine with the quantum dots by a coordination bond and generates accordingly: —COO(H)—R, —S(H)—R, —NH(H)R, wherein R is a cation on a surface of the quantum dots; while —COO—, —S—, —NH are easy to recombine with the H in the free state, and separate from the cation on the surface of the quantum dots, before forming a carboxylic acid, a thiol and an amine. A stability of a quantum dot colloid solution generated through this kind of directly combining the proton-containing ligands with the quantum dots is extremely poor, a combination of the ligand and the quantum dot is extremely weak.

In order to solve a problem of the combination of the ligand and the quantum dot extremely weak, and the stability of the quantum dot colloid solution generated extremely poor, the present invention uses a deprotonating agent to pretreat the proton-containing ligand, removes the H in the proton-containing ligands, and obtains the deprotonated ligand.

As a specific implementation, adding the deprotonating agent to the proton-containing ligand solution for a reaction, a molar ratio of the deprotonating agent to the proton-containing ligand is 1:1-6, preferably 1:2; stirring under a room temperature for 15-120 min, after the proton-containing ligand solution and the deprotonating agent are mixed, standing for 10-30 min, and a solution of the deprotonated ligand is then obtained after the reaction is completed.

In the present implementation, the proton-containing ligand is one of a carboxylic acid having a C atom number equal to or less than 18, a proton-containing thiol ligand, or a proton-containing amine.

In an embodiment, the carboxylic acid having the C atom number equal to or less than 18 is one of, but not limited to, valeric acid, pentenoic acid, hexanoic acid, hexenoic acid, nonanoic acid, decanoic acid, undecanoic acid, undecylenic acid, dodecanoic acid, dodecenoic acid, myristyl acid, tetradecenic acid, palm iticacid acid, hexadecenoic acid, oleic acid and octadecanoic acid.

The proton-containing thiol ligand is one of, but not limited to, a thiol, a dithiol, a mercapto acid, a mercapto alcohol or a mercaptoamine, wherein, the thiol is one of, but not limited to, a hexyl mercaptan, an octyl mercaptan, a 1-nonanethiol, a decanethiol, an undecanethiol, a dodecanethiol, a 1-tridecanethiol, a tetradecanethiol, a hexadecanethiol or an octadecanethiol. The dithiol is one of, but not limited to, a 1,2-ethanedithiol, a 1,3-propanedithiol, a 1,4-butanedithiol, a 1,5-pentanedithiol, a 1,6-hexanedithiol, a 1,8-octanedithiol, a 1,10-decanedithiol and more. The mercapto alcohol is one of, but not limited to, a 2-mercaptoethanol, a 3-mercapto-1-propanol, a 4-mercapto-1-butanol, a 5-mercapto-1-pentanol, a 6-mercapto-1-hexanol, an 8-mercapto-1-octanol and more. The mercapto acid is one of, but not limited to, a 2-mercaptoacetic acid, a 3-mercaptopropionic acid, a 4-mercaptobutyric acid, a mercapto succinic acid, a 6-mercaptohexanoic acid, a 4-mercaptobenzoic acid, a cysteine and more. The mercaptoamine is one of, but not limited to, a 2-mercaptoethylamine, a 3-mercaptopropylamine, a 4-mercaptobutylamine, a 5-decylpentylamine, a 6-decylhexylamine, a 2-amino-3-mercaptopropionic acid, a 2-aminothiophenol, a mercaptoundecane amine and more.

The proton-containing amine is one of, but not limited to, an alkylamine, a mercaptoamine, an amino acid or an amide, wherein the alkylamine is one of, but not limited to, a methylamine, a dimethylamine, an ethylamine, a methylethylamine, an ethylenediamine, a propylamine, a butylamine, a tertiary butylamine, a pentylamine, an n-hexylamine, a cyclohexylamine, a methylhexylamine, a heptylamine, a diheptane amine, an octylamine, a di-n-octylamine, a decylamine, a 4-octylaniline, an N,N'-dimethyl-1,8-octanediamine, a bis(2-ethylhexyl)amine, an aniline, a benzylamine, a p-methylaniline, an N-toluidine, a dodecylamine, a tetradecylamine, a hexadecylamine, an octadecylamine, an oleylamine and more. The mercaptoamine is one of, but not limited to, a 2-mercaptoethylamine, a 3-mercaptopropylamine, a 4-mercaptobutylamine, a 5-mercaptopentylamine, a 6-mercaptohexylamine, a 2-amino-3-mercaptopropionic acid, a 2-aminothiophenol or a mercaptoundecylamine. The amino acid is one of, but not limited to, glycine, alanine, valine, leucine, isoleucine, cysteine, phenylalanine, glutamic acid, asparagines, lysine, and more. The amide is one of, but not limited to, formamide, acetamide, propionamide, butanamide, valeramide, hexamide, asparagine, pyridine amide, salicylamide, tetrahydrofuran-2-carboxamide, and more.

The present implementation, wherein the deprotonating agent is one of an organic base, inorganic base, carboxylic acid, acyl chloride or sulfonyl chloride.

In an embodiment, the organic base is one of, but not limited to, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, methyltriethylammonium hydroxide, trimethylphenylammonium hydroxide, cetyltrimethylammonium hydroxide or hexamethylammonium hydroxide.

The carboxylic acid is one of, but not limited to, a formic acid, an acetic acid, a propionic acid, a butyric acid, a valeric acid, a hexanoic acid, a caprylic acid, a heptanoic acid, a benzoic acid, a phenylacetic acid, a phenylpropionic acid, a phenylbutyric acid, a phenylvaleric acid, a phenylhexanoic acid or a phenylalanine.

The inorganic base is one of, but not limited to, a sodium hydroxide, potassium hydroxide, calcium hydroxide, barium hydroxide, aluminum hydroxide, indium hydroxide or ammonium hydroxide.

The acyl chloride is one of, but not limited to, acetyl chloride, propionyl chloride, butyryl chloride, valeryl chloride, hexanoyl chloride, 2-chloropropionyl chloride, 3-chloropropionyl chloride, 4-chlorobutyryl chloride, 1-butylsulfonyl chloride, 1-hexadecanesulfonyl chloride, 1-octanesulfonyl chloride, 1,7-pimeloyl chloride, 1,3,5-benzenetricarbonyl chloride, 4-chlorobenzoyl chloride, 5-chloropentanoyl chloride, 6-chlorohexanoyl chloride or 2-chloropyridine-4-formyl chloride.

The sulfonyl chloride is one of, but not limited to, methylsulfonyl chloride, ethylsulfonyl chloride, propylsulfonyl chloride, butylsulfonyl chloride, pentylsulfonyl chloride, hexylsulfonyl chloride, octanesulfonyl chloride, hexadecanesulfonyl chloride, 2-chloroethanesulfonyl chloride, benzenesulfonyl chloride or p-benzenesulfonyl chloride.

Further, preparing the quantum dot solution having the original ligand in advance, wherein the original ligand, acting as a surface blocking agent of the quantum dot, is able to reduce a plurality of surface detects of the quantum dot to improve a luminous efficiency of the quantum dot. However, the original ligand and the quantum dot have a plurality of problems, including a weak combination ability, a poor stability of the quantum dot colloid solution formed and a relatively poor solubility. In a specific embodiment, the original ligand is selected from trioctylphosphine, trioctylphosphine oxide, tributylphosphine, tributylphosphine oxide, oleic acid, stearic acid and oleylamine Furthermore, the present implementation mixes the quantum dot solution having the original ligand prepared with the deprotonated ligand, and a molar ratio of the quantum dot having the original ligand to the deprotonated ligand is 1:1-8, preferably 1:2. During a process of the ligand exchange reaction, stirring is continued for 15-120 min. Specifically, a ligand exchange reaction occurs right after the quantum dot solution having the original ligand is mixed with the deprotonated ligand, while a continuous stirring may accelerate the reaction and make the reaction more uniform. After the ligand exchange reaction has completed, standing for 10-30 min, finally adding ethyl acetate and centrifugating for 2-4 times, before obtaining the quantum dot having the surface of the deprotonated ligand. Since the solution lacks of the free H to bind with the ligand, thus the quantum dot ligands are not easy to fall off, having a stronger stability.

Preferably, a material of the quantum dot is one of, but not limited to, CdSe, CdS, ZnSe, ZnS, PbSe, PbS, CdTe, $Cd_{1-x}Zn_xS$, $Cd_{1-x}Zn_xSe$, $CdSe_yS_{1-y}$, $Cd_{1-x}Zn_xSe_yS_{1-y}$, $PbSe_xS_{1-x}$, $Zn_xCd_{1-x}Te$, CdSe/ZnS, CdS/ZnS, $Cd_{1-x}Zn_xSe/ZnS$, $Cd_{1-x}Zn_xS/ZnS$, CdSe/CdS/ZnS, CdSe/ZnSe/ZnS, $CdS/Cd_{1-x}Zn_xS/Cd_yZn_{1-y}S/ZnS$, $CdSe/Cd_{1-x}Zn_xSe/CdyZn_{1-y}Se/ZnSe$, InP, InP/ZnS, ZnO, MgO, $CeO_2$, NiO, $TiO_2$, $CaF_2$, $NaYF_4$ or $NaCdF_4$.

The quantum dot ligand exchange method provided by the invention has a fast reaction rate, and the deprotonated ligand after exchange has strong binding with the cation on the surface of the quantum dot, and the exchanged quantum dot colloid solution has strong stability, good solubility and high luminous efficiency.

As a specific embodiment, the proton-containing ligand is a carboxylic acid, and the deprotonating agent is an organic base or an inorganic base. The present embodiment pretreats the carboxylic acid ligand by using an organic base or an inorganic base, to obtain a deprotonated carboxylic acid ligand, that is, a carboxylate; then mixes and stirs the deprotonated carboxylic acid ligand and the quantum dot having the original ligand, to carry out a ligand exchange reaction, before obtaining a quantum dot having a surface of a deprotonated carboxylic acid.

In a specific embodiment, the carboxylic acid is one of, but not limited to, valeric acid, pentenoic acid, hexanoic acid, hexenoic acid, nonanoic acid, decanoic acid, undecanoic acid, undecylenic acid, dodecanoic acid, dodecenoic acid, myristyl acid, tetradecenoic acid, palmitic acid, hexadecenoic acid, oleic acid or octadecanoic acid.

The organic base is one of, but not limited to, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, methyltriethylammonium hydroxide, trimethylphenylammonium hydroxide, cetyltrimethylammonium hydroxide or hexamethylammonium hydroxide.

The inorganic base is one of, but not limited to, sodium hydroxide, potassium hydroxide, calcium hydroxide, barium hydroxide, aluminum hydroxide, indium hydroxide or ammonium hydroxide.

In another specific implementation, when the proton-containing ligand is the thiol, the deprotonating agent is one of an organic base, an inorganic base, or a carboxylic acid. Specifically, when the deprotonating agent is an organic base, it reacts with a proton-containing thiol ligand and generates a $(R_1)_4N$—$SR_2$ ($R_1$ and $R_2$ are alkyl groups); when the deprotonating agent is an inorganic base, it reacts with a proton-containing thiol ligand and generates a $R_1$—S—$R_2$ ($R_1$ is a cation in the inorganic base, $R_2$ is an alkyl). When the deprotonating agent is a carboxylic acid, it reacts with the proton-containing sulfhydryl ligand to form a carboxylic acid thiol ester such as $R_1COSR_2$ ($R_1$, $R_2$ are alkyl groups); when a thiol ligand after a deproton agent treatment mixes with a solution of the quantum dot having the original ligand, the thiol ligand after the deproton agent treating combines with the cation on the surface of the quantum dot in a form of X—$SR_2$ (X is a cation on the surface of the quantum dot), while there is no free H combining with the ligand, thus, the quantum dot is not easy to fall off the thiol ligand after the deproton agent treating, having a better stability.

In a specific embodiment, the proton-containing thiol ligand is one of a thiol, a dithiol, a mercapto acid, a mercapto alcohol or a mercaptoamine, wherein, the thiol is one of, but not limited to, a hexyl mercaptan, an octyl mercaptan, a 1-nonanethiol, a decanethiol, an undecanethiol, a dodecanethiol, a 1-tridecanethiol, a tetradecanethiol, a hexadecanethiol or an octadecanethiol.

The organic base is one of, but not limited to, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, methyltriethylammonium hydroxide, trimethylphenylammonium hydroxide, cetyltrimethylammonium hydroxide or hexamethylammonium hydroxide.

The inorganic base is one of, but not limited to, sodium hydroxide, potassium hydroxide, calcium hydroxide, barium hydroxide, aluminum hydroxide, indium hydroxide or ammonium hydroxide.

The carboxylic acid is one of, but not limited to, a formic acid, an acetic acid, a propionic acid, a butyric acid, a valeric acid, a hexanoic acid, a caprylic acid, a heptanoic acid, a benzoic acid, a phenylacetic acid, a phenylpropionic acid, a phenylbutyric acid, a phenylvaleric acid, a phenylhexanoic acid or a phenylalanine.

In another specific implementation, when the ligand is the proton-containing amine, the deprotonating agent is acyl chloride or sulfonyl chloride. Specifically, when the deprotonating agent is an acyl chloride, it reacts with a proton-containing amine and generates an acyl amine $R_1CONHR_2$ ($R_1$ and $R_2$ are alkyl groups); when the deprotonating agent is a sulfonyl chloride, it reacts with a proton-containing amine and generates a sulfonyl amine $R_1SO_2NHR_2$ ($R_1$ and $R_2$ are alkyl groups). When an amine ligand after a deproton agent treatment (acyl chloride or sulfonyl chloride) mixes with a solution of the quantum dot having the original ligand, the amine ligand after the deproton agent treating combines with the cation on the surface of the quantum dot in a form of X—$NHR_2$ (X is a cation on the surface of the quantum dot, $R_2$ is alkyl), while there is no free H combining with the ligand, thus, the quantum dot is not easy to fall off the thiol ligand after the deproton agent treating, having a better stability.

In a specific embodiment, the proton-containing amine is one of, but not limited to, an alkylamine, a mercaptoamine, an amino acid or an amide.

The acyl chloride is one of, but not limited to, acetyl chloride, propionyl chloride, butyryl chloride, valeryl chloride, hexanoyl chloride, 2-chloropropionyl chloride, 3-chloropropionyl chloride, 4-chlorobutyryl chloride, 1-butylsulfonyl chloride, 1-hexadecanesulfonyl chloride, 1-octanesulfonyl chloride, 1,7-pimeloyl chloride, 1,3,5-benzenetricarbonyl chloride, 4-chlorobenzoyl chloride, 5-chlorovaleryl chloride, 6-chlorohexanoyl chloride or 2-chloropyridine-4-carbonyl chloride.

The sulfonyl chloride is one of, but not limited to, methylsulfonyl chloride, ethylsulfonyl chloride, propylsulfonyl chloride, butylsulfonyl chloride, pentylsulfonyl chloride, hexylsulfonyl chloride, octanesulfonyl chloride, hexadecanesulfonyl chloride, 2-chloroethanesulfonyl chloride, benzenesulfonyl chloride or p-benzenesulfonyl chloride.

In another specific implementation, when the proton-containing ligand is an oil soluble ligand, a solution of the oil soluble ligand is pretreated using the deprotonating agent, and a solution phase separation is generated, before an aqueous phase is removed and a solution containing oil soluble deprotonated ligand is then obtained. The deprotonating agent is one of an organic base, an inorganic base, a carboxylic acid, an acyl chloride or a sulfonyl chloride. Specifically, since a presence of an aqueous phase may affect the ligand exchange reaction between the oil soluble deprotonated ligand and the quantum dot having the original ligand. thereby affecting the luminous efficiency of the quantum dot having the surface of the oil soluble deprotonated ligand finally prepared. Thus when using the deprotonating agent to make a deprotonating process to the oil soluble ligand, after the solution generates the phase separation, the aqueous phase shall be removed, and an oil phase solution containing the deprotonating ligand is obtained through separating the solution.

Wherein the organic base is one of, but not limited to, a tetramethylammonium hydroxide, a tetraethylammonium hydroxide, a tetrapropylammonium hydroxide, a tetrabutylammonium hydroxide, a tetrapentylammonium hydroxide, a tetrahexylammonium hydroxide, a tetraoctylammonium hydroxide, a methyltriethylammonium hydroxide, a trimethylphenylammonium hydroxide, a cetyltrimethylammonium hydroxide or a hexamethylammonium hydroxide.

The carboxylic acid is one of, but not limited to, a formic acid, an acetic acid, a propionic acid, a butyric acid, a valeric acid, a hexanoic acid, a caprylic acid, a heptanoic acid, a benzoic acid, a phenylacetic acid, a phenylpropionic acid, a phenylbutyric acid, a phenylvaleric acid, a phenylhexanoic acid or a phenylalanine.

The inorganic base is one of, but not limited to, sodium hydroxide, potassium hydroxide, calcium hydroxide, barium hydroxide, aluminum hydroxide, indium hydroxide or ammonium hydroxide.

The acyl chloride is one of, but not limited to, acetyl chloride, propionyl chloride, butyryl chloride, valeryl chloride, hexanoyl chloride, 2-chloropropionyl chloride, 3-chloropropionyl chloride, 4-chlorobutyryl chloride, 1-butylsulfonyl chloride, 1-hexadecanesulfonyl chloride, 1-octanesulfonyl chloride, 1,7-pimeloyl chloride, 1,3,5-benzenetricarbonyl chloride, 4-chlorobenzoyl chloride, 5-chlorovaleryl chloride, 6-chlorohexanoyl chloride or 2-chloropyridine-4-carbonyl chloride.

The sulfonyl chloride is one of, but not limited to, methylsulfonyl chloride, ethylsulfonyl chloride, propylsulfonyl chloride, butylsulfonyl chloride, pentylsulfonyl chloride, hexylsulfonyl chloride, octanesulfonyl chloride, hexadecanesulfonyl chloride, 2-chloroethanesulfonyl chloride, benzenesulfonyl chloride or p-benzenesulfonyl chloride.

In an embodiment, the oil soluble ligand is one of a carboxylic acid having a C atom number larger than or equal to 8, an oil-soluble proton-containing amine or an oil-soluble proton-containing thiol. Wherein the carboxylic acid having the C atom number greater than or equal to 8 includes, but not limited to: nonanoic acid, decanoic acid, undecanoic acid, undecylenic acid, dodecyl acid, dodecenoic acid, myristyl acid, tetradecene acid, palmitic acid, hexadecenoic acid, oleic acid or octadecanoic acid.

The oil soluble proton-containing amine is one of oil soluble alkylamine or mercaptoamine, wherein the oil soluble alkylamine is one of, but not limited to, octylamine, di-n-octylamine, decylamine, 4-octylaniline, N,N'-dimethyl-1,8-octanediamine, bis(2-ethylhexyl)amine, aniline, benzylamine, p-methylaniline, N-toluidine, dodecylamine, tetradecylamine, hexadecylamine, octadecylamine or oleylamine. The oil soluble mercaptoamine is one of, but not limited to, 2-aminothiophenol or mercapto undecane amine.

The oil soluble proton-containing thiol is one of an oil soluble thiol, an oil soluble dithiol, an oil soluble mercapto alcohol or an oil soluble mercaptoamine, wherein the oil soluble thiol is one of, but not limited to, 1-nonanethiol, decanethiol, undecanethiol, dodecanethiol, 1-tridecanethiol, tetradecanethiol, hexadecanethiol or octadecanethiol. The oil soluble dithiol is one of, but not limited to, 1,8-octanedithiol or 1,10-decanedithiol. The oil soluble mercapto alcohol is one of 8-mercapto-1-octanol or 8-mercapto-1-decanol. The oil soluble mercaptoamine is one of, but not limited to, mercapto undecane amine.

In another specific implementation thereof, when the proton-containing ligand is a water soluble ligand, the deprotonating agent is one of an organic base, an inorganic base, a carboxylic acid, an acyl chloride or a sulfonyl chloride.

Wherein the organic base is one of, but not limited to, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, methyltriethylammonium hydroxide, trimethylphenylammonium hydroxide, or hexamethylammonium hydroxide.

The inorganic base is one of, but not limited to, sodium hydroxide, potassium hydroxide, calcium hydroxide, barium hydroxide, aluminum hydroxide, indium hydroxide or ammonium hydroxide.

The acyl chloride is one of, but not limited to, acetyl chloride, propionyl chloride, butyryl chloride, valeryl chloride, hexanoyl chloride, 2-chloropropionyl chloride, 3-chloropropionyl chloride, 4-chlorobutyryl chloride, 1-butylsulfonyl chloride, 1-hexadecanesulfonyl chloride, 1-octanesulfonyl chloride, 1,7-peptanedioyl chloride, 1,3,5-benzenetricarbonyl chloride, 4-chlorobenzoyl chloride, 5-chlorovaleryl chloride, 6-chlorohexanoyl chloride or 2-chloropyridine-4-carbonyl chloride.

The sulfonyl chloride is one of, but not limited to, methylsulfonyl chloride, ethylsulfonyl chloride, propylsulfonyl chloride, butylsulfonyl chloride, pentylsulfonyl chloride, hexylsulfonyl chloride, 2-chloroethanesulfonyl chloride, benzenesulfonyl chloride or p-benzenesulfonyl chloride.

In an embodiment, the water soluble ligand is one of a carboxylic acid having the C atom number smaller than 8 (C atom in the phenyl are not counted), a water soluble proton-containing amine or a water soluble proton-containing thiol. Wherein the carboxylic acid having the C atom number smaller than 8 is any one of, but not limited to, formic acid, acetic acid, propionic acid, butyric acid, valeric acid, pentenoic acid, hexanoic acid, hexenoic acid, caprylic acid, benzoic acid, phenylacetic acid, phenylpropionic acid, phenylbutyric acid, phenylpentene acid, phenylhexanoic acid and phenylalanine.

When the ligand is a water soluble proton-containing thiol ligand, it may be one of a water soluble mercapto acid, a water soluble mercapto alcohol, or a water soluble mercapto amine; specifically, the water soluble mercapto alcohol is one of, but not limited to, a 2-mercaptoethanol, a 3-mercapto-1-propanol, a 4-mercapto-1-butanol, a 5-mercapto-1-pentanol, or a 6-mercapto-1-hexanol; the water soluble mercapto acid is one of, but not limited to, a 2-mercaptoacetic acid, a 3-mercaptopropionic acid, a 4-mercaptobutyric acid, a mercapto succinic acid, or a 6-mercaptohexanoic acid; the water soluble mercapto amine is one of, but not limited to, a 2-mercaptoethylamine, a 3-mercaptopropylamine, a 4-mercaptobutylamine, a 5-decylpentylamine, a 6-decylhexylamine, or a 2-amino-3-mercaptopropionic acid.

When the ligand is a water soluble proton-containing amine, it may be one of a water soluble amino acid or an amide; specifically, the water soluble amino acid is anyone of glycine, phenylalanine, glutamic acid, asparagine or lysine; the amide includes formamide, acetamide, propionamide, butanamide, valeramide, hexamide, asparagine, pyridine amide, salicylamide, tetrahydrofuran-2-carboxamide, and more.

The quantum dot surface ligand exchange method disclosed in the present invention is further described below, referencing to a plurality of specific embodiments.

Embodiment 1

1. Preparing a Quantum Dot Having a Surface Ligand of the Octadecenoic Acid:

1). Preparing a cadmium oleate-zinc precursor solution: take 0.8 mmol of CdO, 8 mmol of zinc acetate, 15 ml of oleic acid and 20 ml of 1-octadecene before putting in a 100 mL three-necked flask, and heat to 150° C. for 1 h under an Ar atmosphere, before forming a transparent cadmium oleate-zinc precursor solution;

2). Preparing an Se—S—ODE precursor solution: take 0.8 mmol of Se and 8 mmol S and dissolve into 6 ml of 1-octadecene solution at 140° C., before forming the Se—S—ODE precursor solution;

3). Heat slowly the cadmium oleate-zinc precursor solution to 300° C., inject fast the Se—S—ODE precursor solution one time, and keep for 8 min. Followed by lowering the temperature to 100° C., and input ethyl acetate for a cleaning, before obtaining a precipitate by a centrifugation; followed by adding chloroform and acetone before repeating a centrifugation twice, and obtaining a precipitate of a quantum dot having the surface ligand of octadecenoic acid.

2. Removing a Proton from the Proton-Containing Ligand:

take 8 mmol of tetramethylammonium hydroxide and dissolve in chloroform, add 8 mmol of octyl mercaptan and stir for 30 min at a room temperature, and stand for 15 min, before a phase separation of the solution is generated, separate the solution and obtain a chloroform phase, thus obtaining a octyl mercaptan solution processed by the tetramethylammonium hydroxide.

3. A Process of Exchanging the Ligand:

Prepare the quantum dot having the surface ligand of octadecenoic acid into a chloroform solution of 10 mg/ml, add in the octyl mercaptan solution processed by the tetramethylammonium hydroxide, stir for 30 min at the room temperature, and stand for 15 min, add the actyl actate and centrifuge twice, before obtaining a quantum dot having a surface ligand of deprotonated octyl mercaptan.

Figure 2:
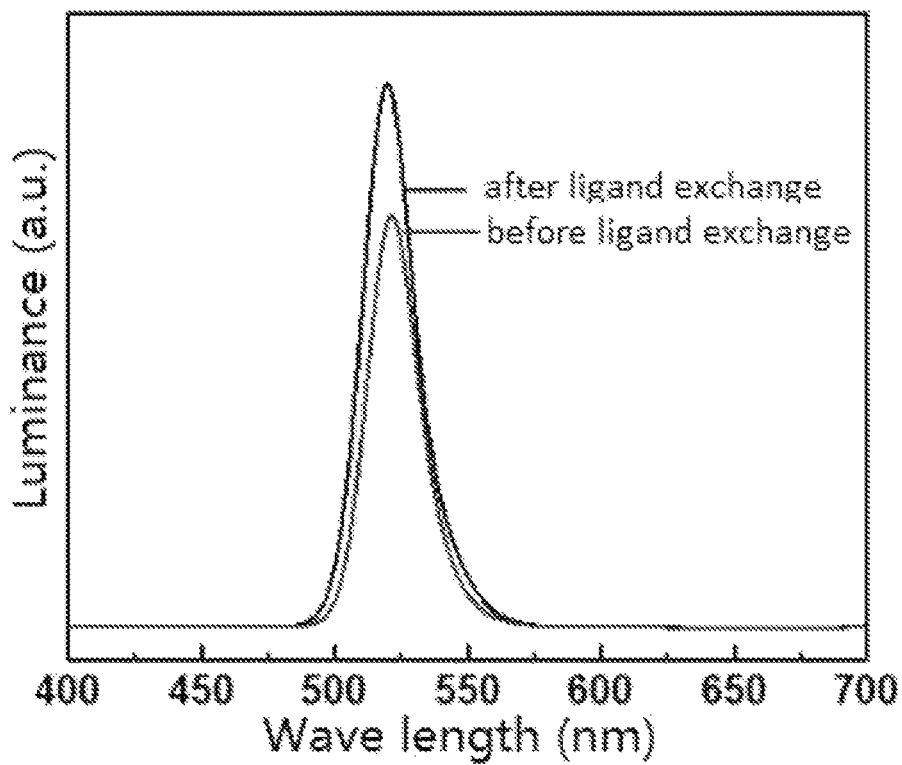
FIG. 2 illustrates an emission spectrum diagram before and after the ligand exchange of the quantum dot as in an embodiment 1 of the present invention.

Further, FIG. 2 illustrates an emission spectrum diagram before and after the ligand exchange of the quantum dot as in the embodiment 1, shown as FIG. 2, the quantum dot increases a luminescence intensity thereof after the ligand exchange; which indicates that the ligand may be effectively combined with the cation on the surface of the quantum dot after being treated by the deprotonating agent, and reduce a plurality of defects on the surface, thereby improving the luminous efficiency.

Figure 3:
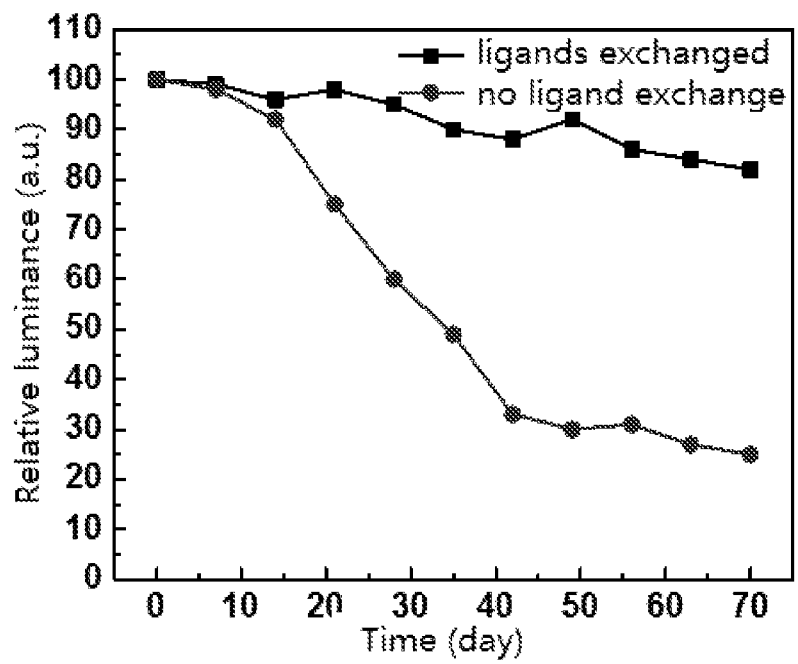
FIG. 3 illustrates a diagram on a relative luminescence intensity over time before and after the ligand exchange of the quantum dot as in an embodiment 1 of the present invention.

Furthermore, FIG. 3 illustrates a diagram on a relative luminescence intensity over time before and after the ligand exchange of the quantum dot as in the embodiment 1, shown as FIG. 3, after the ligand exchange, the luminescence intensity of the quantum dot decreases little by time; which also shows that after treating the ligand by the deprotonated agent, the ligand is able to combine effectively with the cation on the surface of the quantum dot after being treated by the deprotonating agent, and reduce the defects on the surface, thereby improving the luminous efficiency.

Embodiment 2

1. Preparing a ZnO Quantum Dot Having a Surface Ligand of the Stearic Acid:

1). Preparing a zinc stearate precursor solution: take 2 mmol of zinc stearate, and add 30 ml of ODE, exhaust with Ar at a temperature of 130° C. for 30 min, until a solution becomes colorless and transparent, the zinc stearate precursor solution is then obtained;

2). Preparing a long-chain alcohol precursor solution: take 10 mmol ODA and dissolve in 12.6 ml ODE, exhaust at a temperature of 130° C. for 30 min, until a solution becomes colorless and transparent, the solution is then raised to a temperature of 200° C., before the long-chain alcohol precursor solution is obtained.

3) preparing the ZnO quantum dot: raise a temperature of the zinc stearate precursor solution to 270° C., then inject quickly the long-chain alcohol precursor solution into the zinc stearate precursor solution, keep a reaction at 250° C. for 4 min. Followed by cooling the solution to the room temperature, and washing twice, before a participate is obtained, which is then dried under vacuum at the room temperature for 24 h, and a dried ZnO crystal is obtained;

2. Removing a Proton from the Proton-Containing Ligand:

take 4 mmol of tetraethylammonium hydroxide and put into a solution of n-hexane containing 8 mmol of 1,2-ethanedithiol, stir for 30 min at the room temperature, then leave it stand for 15 min, and take an n-hexane phase to obtain a 1,2-ethanedithiol solution treated by the tetraethylammonium hydroxide;

3. A Process of Exchanging the Ligand:

Take 100 mg of a quantum dot with the surface ligand of stearic acid and put into 10 ml of n-hexane, mix uniformly, then add the 1,2-ethanedithiol solution treated by the tetraethylammonium hydroxide, stir for 30 min at the room temperature, and stand for 15 min, extract a lower layer liquid and add ethyl acetate before centrifuging twice to obtain a quantum dot having a surface ligand of deprotonated ethanedithiol.

Embodiment 3

1. Preparing a Quantum Dot Having a Ligand of the Octadecenoic Acid:

1). Preparing a cadmium oleate-zinc precursor solution: take 0.8 mmol of CdO, 8 mmol of zinc acetate, 15 ml of oleic acid and 20 ml of 1-octadecene before putting in a 100 mL three-necked flask, and heat to 150° C. for 1 h under an Ar atmosphere, before forming a transparent cadmium oleate-zinc precursor solution;

2). Preparing an Se—S—ODE precursor solution: take 0.8 mmol of Se and 8 mmol S and dissolve into 6 ml of 1-octadecene solution at 140° C., before forming the Se—S—ODE precursor solution;

3). Heat slowly the cadmium oleate-zinc precursor solution to 300° C., inject fast the Se—S—ODE precursor solution one time, and keep for 8 min. Followed by lowering the temperature to 100° C., and input ethyl acetate for washing, before obtaining a precipitate by centrifugation; followed by adding chloroform and acetone before repeating the centrifugation twice, and obtaining a precipitate of a quantum dot having the surface ligand of octadecenoic acid.

2. Removing a Proton from the Proton-Containing Ligand:

Take 8 mmol of tetramethylammonium hydroxide and put into a solution of n-hexane containing 16 mmol of 2-mercaptoethanol, stir for 15 min at the room temperature, then leave it stand for 15 min, and take an n-hexane phase to obtain a 2-mercaptoethanol solution treated by the tetramethylammonium hydroxide;

3. A Process of Exchanging the Ligand:

Prepare the quantum dot having the surface ligand of octadecenoic acid into an n-hexane solution of 10 mg/ml, add in the 2-mercaptoethanol solution treated by the tetramethylammonium hydroxide, heat and stir for 15 min at the room temperature, and stand for 15 min, extract and obtain a lower layer liquid, then add ethyl acetate before centrifuging twice to obtain a quantum dot having a surface ligand of a deprotonated mercaptoethanol.

Figure 4:
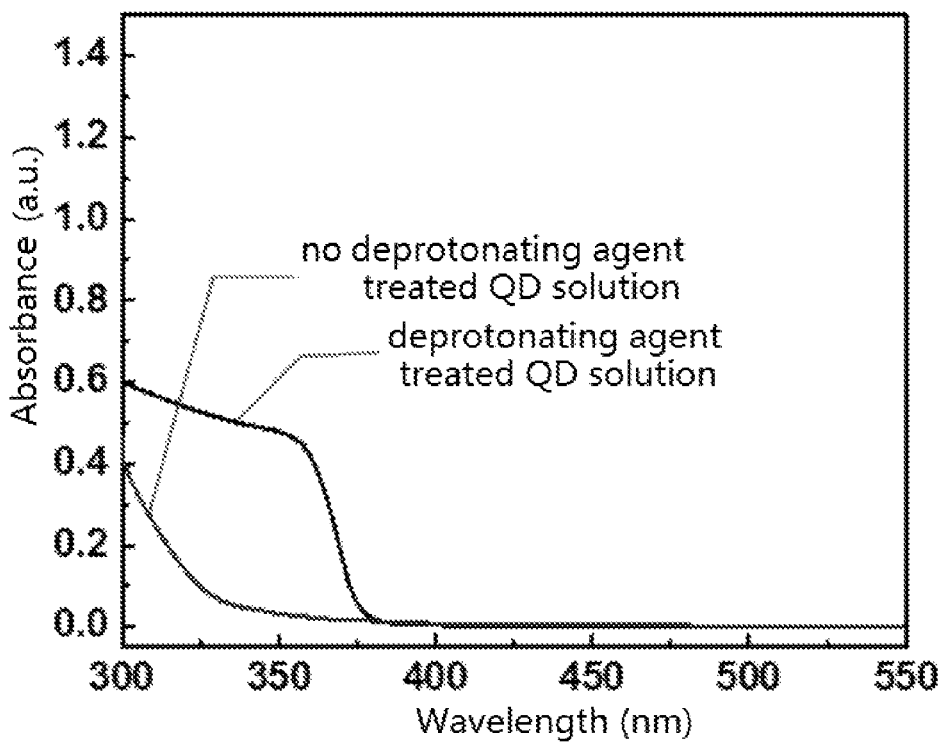
FIG. 4 illustrates a schematic diagram showing an absorption curve of a solution after exchanging the quantum dot ligand with/without a pretreatment to the ligand by using a deprotonating agent in an embodiment 3 of the present invention.

Further, FIG. 4 illustrates a schematic diagram showing an absorption curve of a solution after exchanging the quantum dot ligand with/without a pretreatment to the ligand by using the deprotonating agent; shown as FIG. 4, wherein a quantum dot obtained without using the deprotonating agent to pretreat the ligand is hard to dissolve in an ethanol, there are a big amount of participate at a bottom of the solution; while a quantum dot obtained by using the deprotonating agent to pretreat the ligand is fully dissolved in the ethanol, and the solution is transparent. Take two supernatants of the two solutions and test by ultraviolet-visible absorption spectroscopy, from the figure, it can be seen that without a deprotonation process to the ligand, there is no band edge absorption of ZnO in the absorption curve of the quantum dot solution. While the ligand is subjected to the deprotonation process, the solution has a band edge absorption peak of ZnO. Which indicates that a solubility of the quantum dot may be effectively improved after pretreating the ligand by the deprotonating agent.

Embodiment 4

1. Preparing a Quantum Dot Having a Ligand of the Trioctylphosphine:

1). Preparing a cadmium oleate-zinc precursor solution: take 0.8 mmol of CdO, 8 mmol of zinc acetate, 15 ml of oleic acid and 20 ml of 1-octadecene before putting in a 100 mL three-necked flask, and heat to 150° C. for 1 h under an Ar atmosphere, before forming a transparent cadmium oleate-zinc precursor solution;

2). Preparing an Se—S—ODE precursor solution: take 0.2 mmol of selenium powder and 0.6 mmol sulfur powder and dissolve into 2 ml of trioctylphosphine, before obtaining a selenium trioctylphosphine-sulfur trioctylphosphine precursor;

3). Heat slowly the cadmium oleate-zinc precursor solution to 300° C., one time inject quickly the selenium trioctylphosphine-sulfur trioctylphosphine precursor, and keep a reaction for 8 min. Followed by lowering the temperature to 100° C., and input ethyl acetate for washing, before obtaining a precipitate by centrifugation; followed by adding chloroform and acetone before repeating the centrifugation twice, and obtaining a precipitate of a quantum dot having the surface ligand of trioctylphosphine.

2. Removing a Proton from the Proton-Containing Ligand:

take 4 mmol of tetramethylammonium hydroxide and put into a solution of n-hexane containing 4 mmol of dodecenoic acid, stir for 30 min at the room temperature, then leave it stand for 15 min, take the liquid, to obtain a dodecenoic acid solution treated by the tetramethylammonium hydroxide;

3. A Process of Exchanging the Ligand:

Take 100 mg of a quantum dot with the surface ligand of trioctylphosphine and put into 10 ml of n-hexane, mix uniformly, then add the dodecenoic acid solution treated by the tetramethylammonium hydroxide, stir for 30 min at the room temperature, and stand for 15 min, before adding ethyl acetate and centrifuging twice, to obtain a quantum dot having a surface ligand of deprotonated dodecenoic acid.

Embodiment 5

1. Preparing a Quantum Dot Having a Ligand of the Octadecenoic Acid:

1). Preparing a cadmium oleate-zinc precursor solution: take 0.8 mmol of CdO, 8 mmol of zinc acetate, 15 ml of oleic acid and 20 ml of 1-octadecene before putting in a 100 mL three-necked flask, and heat to 150° C. for 1 h under an Ar atmosphere, before forming a transparent cadmium oleate-zinc precursor solution;

2). Preparing an Se—S—ODE precursor solution: take 0.8 mmol of Se and 8 mmol S and dissolve into 6 ml of 1-octadecene solution at 140° C., before forming the Se—S—ODE precursor solution;

3). Heat slowly the cadmium oleate-zinc precursor solution to 300° C., inject fast the Se—S—ODE precursor solution one time, and keep for 8 min. Followed by lowering the temperature to 100° C., and input ethyl acetate for washing, before obtaining a precipitate by centrifugation; followed by adding chloroform and acetone before repeating the centrifugation twice, and obtaining a precipitate of a quantum dot having the surface ligand of octadecenoic acid.

2. Removing a Proton from the Proton-Containing Ligand:

Take 4 mmol of ammonium hydroxide and put into a water solution containing 4 mmol of hexanoic acid, stir for 30 min at the room temperature, then leave it stand for 15 min, and obtain a hexanoic acid solution treated by the ammonium hydroxide.

3. A Process of Exchanging the Ligand:

Take 100 mg of the quantum dots having the ligand of the octadecenoic acid and put into 10 ml of n-hexane, stir equally, then add the hexanoic acid solution treated by the ammonium hydroxide, stir for 30 min at the room temperature, and stand for 15 min, extract and obtain a lower layer of liquid, add ethyl acetate before centrifuging twice to obtain a quantum dot having a surface ligand of a deprotonated hexanoic acid.

Embodiment 6

1. Preparing a Quantum Dot Having a Surface Ligand of the Octadecenoic Acid:

1). 1). Preparing a cadmium oleate-zinc precursor solution: take 0.8 mmol of CdO, 8 mmol of zinc acetate, 15 ml of oleic acid and 20 ml of 1-octadecene before putting in a 100 mL three-necked flask, and heat to 150° C. for 1 h under an Ar atmosphere, before forming a transparent cadmium oleate-zinc precursor solution;

2). Preparing an Se—S—ODE precursor solution: take 0.8 mmol of Se and 8 mmol S and dissolve into 6 ml of 1-octadecene solution at 140° C., before forming the Se—S—ODE precursor solution;

3). Heat slowly the cadmium oleate-zinc precursor solution to 300° C., inject fast the Se—S—ODE precursor solution one time, and keep for 8 min. Followed by lowering the temperature to 100° C., and input ethyl acetate for washing, before obtaining a precipitate by centrifugation; followed by adding chloroform and acetone before repeating the centrifugation twice, and obtaining a precipitate of a quantum dot having the surface ligand of octadecenoic acid.

2. Removing a Proton from the Proton-Containing Ligand:

Take 4 mmol of propionyl chloride and 4 mmol of octylamine and add to a chloroform solution, stir at the room temperature for 30 minutes to obtain a propionyl chloride-treated octylamine solution.

3. A Process of Exchanging the Ligand:

Prepare the quantum dot having the surface ligand of octadecenoic acid into an chloroform solution of 10 mg/ml, add in the propionyl chloride-treated octylamine solution, stir for 60 min at the room temperature, and stand for 15 min, add ethyl acetate before centrifuging twice to obtain a quantum dot having a surface ligand of a deprotonated octylamine.

Embodiment 7

1. Preparing a Quantum Dot Having a Ligand of the Octadecenoic Acid:

1). Preparing a cadmium oleate-zinc precursor solution: take 0.8 mmol of CdO, 8 mmol of zinc acetate, 15 ml of oleic acid and 20 ml of 1-octadecene before putting in a 100 mL three-necked flask, and heat to 150° C. for 1 h under an Ar atmosphere, before forming a transparent cadmium oleate-zinc precursor solution;

2). Preparing an Se—S—ODE precursor solution: take 0.8 mmol of Se and 8 mmol S and dissolve into 6 ml of 1-octadecene solution at 140° C., before forming the Se—S—ODE precursor solution;

3). Heat slowly the cadmium oleate-zinc precursor solution to 300° C., inject fast the Se—S—ODE precursor solution one time, and keep for 8 min. Followed by lowering the temperature to 100° C., and input ethyl acetate for washing, before obtaining a precipitate by centrifugation; followed by adding chloroform and acetone before repeating the centrifugation twice, and obtaining a precipitate of a quantum dot having the surface ligand of octadecenoic acid.

2. Removing a Proton from the Proton-Containing Ligand:

Take 4 mmol of benzenesulfonyl chloride and 4 mmol of phenylalanine and add to an aqueous solution, stir for 30 min at the room temperature, before obtaining a phenylsulfonyl chloride treated phenylalanine solution.

3. A Process of Exchanging the Ligand:

Prepare the quantum dot having the surface ligand of octadecenoic acid into an chloroform solution of 10 mg/ml, add in the phenylsulfonyl chloride treated phenylalanine solution, stir for 60 min at the room temperature, and stand for 15 min, add ethyl acetate before centrifuging twice to obtain a quantum dot having a surface ligand of a deprotonated phenylalanine.

Embodiment 8

1. Preparing a Quantum Dot Having a Ligand of the Octadecenoic Acid:

1). Preparing a cadmium oleate-zinc precursor solution: take 0.8 mmol of CdO, 8 mmol of zinc acetate, 15 ml of oleic acid and 20 ml of 1-octadecene before putting in a 100 mL three-necked flask, and heat to 150° C. for 1 h under an Ar atmosphere, before forming a transparent cadmium oleate-zinc precursor solution;

2). Preparing an Se—S—ODE precursor solution: take 0.8 mmol of Se and 8 mmol S and dissolve into 6 ml of 1-octadecene solution at 140° C., before forming the Se—S—ODE precursor solution;

3). Heat slowly the cadmium oleate-zinc precursor solution to 300° C., inject fast the Se—S—ODE precursor solution one time, and keep for 8 min. Followed by lowering the temperature to 100° C., and input ethyl acetate for washing, before obtaining a precipitate by centrifugation; followed by adding chloroform and acetone before repeating the centrifugation twice, and obtaining a precipitate of a quantum dot having the surface ligand of octadecenoic acid.

2. Removing a Proton from the Proton-Containing Ligand:

Take 4 mmol of benzenesulfonyl chloride and 4 mmol of aniline and add to an aqueous solution, stir for 30 min at the room temperature, before obtaining a phenylsulfonyl chloride treated aniline solution.

3. A Process of Exchanging the Ligand:

Prepare the quantum dot having the surface ligand of octadecenoic acid into an chloroform solution of 10 mg/ml, add in the phenylsulfonyl chloride treated aniline solution, stir for 60 min at the room temperature, and stand for 15 min, add ethyl acetate before centrifuging twice to obtain a quantum dot having a surface ligand of a deprotonated aniline.

All above, the present invention provides a quantum dot ligand exchange method, wherein a ligand containing a special functional group (a carboxyl, a thiol or an amino) is first pretreated with a deprotonating agent to obtain a deprotonated ligand; then the deprotonated ligand and a solution of the quantum dot having the original ligand are mixed and stirred, to make a ligand exchange reaction, and a quantum dot colloidal solution having a surface of the deprotonated ligand is obtained; the quantum dot ligand exchange method provided by the present invention has a fast reaction speed, a simple operation, the deprotonated ligand after exchange binds firmly to the cation on the surface of the quantum dot, and the quantum dot colloid solution after exchange has a strong stability, an excellent solubility and a high luminescence efficiency.

It should be understood that, the application of the present discloser is not limited to the above examples listed. Ordinary technical personnel in this field can improve or change the applications according to the above descriptions, all of these improvements and transforms should belong to the scope of protection in the appended claims of the present disclosure.

What is claimed is:

1. A quantum dot surface ligand exchange method, comprising:
    pretreating a proton-containing ligand by a deprotonating agent, and obtaining a deprotonated ligand, wherein the proton-containing ligand is a proton-containing amine, and the deprotonating agent is an acyl chloride or sulfonyl chloride;
    mixing a solution of a quantum dot having an original ligand with the deprotonated ligand for a ligand exchange reaction to occur;
    completing the ligand exchange reaction; and
    obtaining a quantum dot having a surface of the deprotonated ligand.

2. The quantum dot surface ligand exchange method according to claim 1, further comprising: adding the deprotonating agent to a solution of the proton-containing ligand, stirring at a room temperature for 15-120 min, before obtaining the deprotonated ligand.

3. The quantum dot surface ligand exchange method according to claim 2, wherein, the deprotonating agent is added to the solution of the proton-containing ligand at a molar ratio 1:1-6 of the deprotonating agent to the proton-containing ligand.

4. The quantum dot surface ligand exchange method according to claim 1, further comprising: after the ligand exchange reaction has completed, standing for 10-30 min, finally adding ethyl acetate and centrifugating for 2-4 times, before obtaining the quantum dot having the surface of the deprotonated ligand.

5. The quantum dot surface ligand exchange method according to claim 1, wherein in the solution of the quantum dot having the original ligand, the original ligand of the quantum dot is one of a trioctylphosphine, a trioctylphosphine oxide, a tributylphosphine, a tributylphosphine oxide, an oleic acid, a stearic acid, and an oleylamine.

6. The quantum dot surface ligand exchange method according to claim 1, wherein, the solution of the quantum dot having the original ligand is mixed with the deprotonated ligand at a molar ratio 1:1-8 of the quantum dot having the original ligand to the deprotonated ligand.

7. The quantum dot surface ligand exchange method according to claim 1, wherein, the proton-containing amine is one of an alkylamine, a mercaptoamine, an amino acid or an amide.

8. The quantum dot surface ligand exchange method according to claim 1, wherein the proton-containing amine is a water soluble ligand, the step of pretreating the proton-containing ligand by the deprotonating agent, and obtaining the deprotonated ligand comprises: using the deprotonating agent to pretreat a solution of the water soluble ligand, before obtaining a water soluble deprotonated ligand.

9. The quantum dot surface ligand exchange method according to claim 1, wherein the proton-containing amine is an oil soluble ligand, and pretreating the proton-containing ligand by the deprotonating agent, and obtaining the deprotonated ligand comprises:
    using the deprotonating agent to pretreat a solution of the oil soluble ligand, to form a phase separated solution including an aqueous phase and a solution phase;
    removing the aqueous phase; and
    obtaining a solution containing an oil soluble deprotonated ligand.

10. The quantum dot surface ligand exchange method according to claim 1, wherein a material of the quantum dot is selected from at least one of: CdSe, CdS, ZnSe, ZnS, PbSe, PbS, CdTe, $Cd_{1-x}Zn_xS$, $Cd_{1-x}Zn_xSe$, $CdSe_yS_{1-y}$, $Cd_{1-x}Zn_xSe_yS_{1-y}$, $PbSe_xS_{1-x}$, $Zn_xCd_{1-x}Te$, CdSe/ZnS, CdS/ZnS, $Cd_{1-x}Zn_xSe/ZnS$, $Cd_{1-x}Zn_xS/ZnS$, CdSe/CdS/ZnS, CdSe/ZnSe/ZnS, $CdS/Cd_{1-x}Zn_xS/Cd_yZn_{1-y}$, S/ZnS, $CdSe/Cd_{1-x}Zn_xSe/CdyZn_{1-y}$, Se/ZnSe, InP, InP/ZnS, ZnO, MgO, $CeO_2$, NiO, $TiO_2$, $CaF_2$, $NaYF_4$, and $NaCdF_4$.

* * * * *